(12) United States Patent
Rozas et al.

(10) Patent No.: US 9,823,931 B2
(45) Date of Patent: Nov. 21, 2017

(54) QUEUED INSTRUCTION RE-DISPATCH AFTER RUNAHEAD

(71) Applicant: NVIDIA Corporation, Santa Clara, CA (US)

(72) Inventors: Guillermo J. Rozas, Los Gatos, CA (US); Alexander Klaiber, Mountain View, CA (US); James van Zoeren, Albuquerque, NM (US); Paul Serris, San Jose, CA (US); Brad Hoyt, Portland, OR (US); Sridharan Ramakrishnan, Hillsboro, OR (US); Hens Vanderschoot, Tigard, OR (US); Ross Segelken, Portland, OR (US); Darrell D. Boggs, Aloha, OR (US); Magnus Ekman, Alameda, CA (US); Aravindh Baktha, Portland, OR (US); David Dunn, Sammamish, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 642 days.

(21) Appl. No.: 13/730,407

(22) Filed: Dec. 28, 2012

(65) Prior Publication Data

US 2014/0189313 A1    Jul. 3, 2014

(51) Int. Cl.
*G06F 9/38* (2006.01)
*G06F 9/30* (2006.01)

(52) U.S. Cl.
CPC .......... *G06F 9/3814* (2013.01); *G06F 9/3842* (2013.01); *G06F 9/3863* (2013.01)

(58) Field of Classification Search
None
See application file for complete search history.

(56) References Cited

U.S. PATENT DOCUMENTS 5,487,146 A    1/1996    Guttag et al.
5,721,855 A    2/1998    Hinton et al.
(Continued)

FOREIGN PATENT DOCUMENTS

EP    0671718    9/1995
GB    2287111    9/1995
(Continued)

OTHER PUBLICATIONS

Altera—"Implementing a Queue Manager in Traffic Management Systems", Feb. 2004, "pp. 1-8".*
(Continued)

*Primary Examiner* — Eric Coleman

(57) ABSTRACT

Various embodiments of microprocessors and methods of operating a microprocessor during runahead operation are disclosed herein. One example method of operating a microprocessor includes identifying a runahead-triggering event associated with a runahead-triggering instruction and, responsive to identification of the runahead-triggering event, entering runahead operation and inserting the runahead-triggering instruction along with one or more additional instructions in a queue. The example method also includes resuming non-runahead operation of the microprocessor in response to resolution of the runahead-triggering event and re-dispatching the runahead-triggering instruction along with the one or more additional instructions from the queue to the execution logic.

20 Claims, 5 Drawing Sheets

(56) References Cited

U.S. PATENT DOCUMENTS

| | | | |
|---|---|---|---|
| 5,870,582 | A | 2/1999 | Cheong et al. |
| 5,956,753 | A | 9/1999 | Glew et al. |
| 6,037,946 | A | 3/2000 | Takeda |
| 6,484,254 | B1* | 11/2002 | Chowdhury .......... G06F 9/3851 |
| | | | 711/169 |
| 6,519,694 | B2 | 2/2003 | Harris |
| 6,665,792 | B1* | 12/2003 | Merchant ................ G06F 9/383 |
| | | | 712/219 |
| 7,010,648 | B2 | 3/2006 | Kadambi et al. |
| 7,062,631 | B1 | 6/2006 | Klaiber et al. |
| 7,117,330 | B1 | 10/2006 | Alverson et al. |
| 7,194,604 | B2 | 3/2007 | Bigelow et al. |
| 7,293,161 | B1* | 11/2007 | Chaudhry et al. ............ 712/216 |
| 7,587,584 | B2 | 9/2009 | Enright et al. |
| 7,752,627 | B2 | 7/2010 | Jones et al. |
| 7,873,793 | B1 | 1/2011 | Rozas et al. |
| 7,890,735 | B2 | 2/2011 | Tran |
| 8,035,648 | B1 | 10/2011 | Wloka et al. |
| 2003/0018685 | A1 | 1/2003 | Kalafatis et al. |
| 2003/0196010 | A1* | 10/2003 | Forin et al. ...................... 710/52 |
| 2004/0128448 | A1 | 7/2004 | Stark et al. |
| 2005/0041031 | A1 | 2/2005 | Diard |
| 2005/0055533 | A1 | 3/2005 | Kadambi et al. |
| 2005/0138332 | A1 | 6/2005 | Kottapalli et al. |
| 2005/0154831 | A1 | 7/2005 | Steely, Jr. et al. |
| 2006/0010309 | A1 | 1/2006 | Chaudhry et al. |
| 2006/0095678 | A1 | 5/2006 | Bigelow et al. |
| 2006/0149931 | A1* | 7/2006 | Haitham ............... G06F 9/3824 |
| | | | 712/218 |
| 2006/0174228 | A1 | 8/2006 | Radhakrishnan et al. |
| 2006/0277398 | A1 | 12/2006 | Akkary et al. |
| 2007/0174555 | A1* | 7/2007 | Burtscher ............. G06F 9/3851 |
| | | | 711/137 |
| 2007/0204137 | A1 | 8/2007 | Tran |
| 2009/0019317 | A1 | 1/2009 | Quach et al. |
| 2009/0327661 | A1 | 12/2009 | Sperber et al. |
| 2010/0199045 | A1* | 8/2010 | Bell .................... G06F 12/0875 |
| | | | 711/137 |
| 2010/0205402 | A1 | 8/2010 | Henry et al. |
| 2010/0205415 | A1 | 8/2010 | Henry et al. |
| 2011/0264862 | A1* | 10/2011 | Karlsson ............... G06F 9/3802 |
| | | | 711/125 |
| 2012/0023359 | A1 | 1/2012 | Edmeades et al. |
| 2012/0089819 | A1 | 4/2012 | Chaudhry et al. |
| 2014/0082291 | A1 | 3/2014 | Van Zoeren et al. |
| 2014/0136891 | A1 | 5/2014 | Holmer et al. |
| 2014/0281259 | A1 | 9/2014 | Klaiber et al. |

FOREIGN PATENT DOCUMENTS

| | | |
|---|---|---|
| TW | 1263938 | 10/2006 |
| TW | 200809514 | 2/2008 |
| TW | 1315488 | 10/2009 |
| TW | 1425418 | 2/2014 |

OTHER PUBLICATIONS

Mutlu, Onur et al., "Runahead Execution: An Alternative to Very Large Instruction Windows for Out-of-order Processors," This paper appears in: "High-Performance Computer Architecture," Feb. 8-12, 2003, 13 pages.

Chaudry, S. et al., "High-Performance Throughput Computing," Micro, IEEE 25.3, pp. 32-45, May 2005, 14 pages.

Dundas, James and Trevor Mudge., Improving Data Cache Performance by Pre-Executing Instructions Under a Cache Miss. Proc. 1999 ACM Int. Conf. on Supercomputing, Jul. 1997, Dept. of Electrical Engineering and Computer Science, University of Michigan, 9 pages.

Rozas, Guillermo J. et al., "Checkpointed Buffer for Re-Entry From Runahead," U.S. Appl. No. 13/463,627, filed May 3, 2012, 27 pages.

Adve, S. et aL, "Shared Memory Consistency models: A Turorial", WRL Research Report 95/7, Western Digital Laboratory, Sep. 1995, 32 pages.

Chaudry, S. et al., "High-Performance Throughput Computing," Micro, IEEE 25.3, pp. 32-45, May, 2005, 14 pages.

Dehnert, et al., The Transmeta Code Morphing Software: using speculation, recovery, and adaptive retranslation to address real-life challenges, Mar. 23, 2003, IEEE, CGO '03 Proceedings of the international symposium on Code generation and optimization: feedback-directed and runtime optimization, pp. 15-24.

Mutlu, O. et al. "Runahead Execution: An Alternative to Very large Instruction Windows for Out-of-order Processors," This paper appears in: "High-Performance Computer Architecture," Feb. 8-12, 2003, 13 pages.

Rozas, J. et al., "Lazy Runahead Operation for a Microprocessor", U.S. Appl. No. 13/708,645, filed Dec. 7, 2012, 32 pages.

Intel Itanium Architecture Software Developer's Manual, Intel, http://www.intel.com/design/itanium/manuals/iasdmanual.htm, 1 page. Mar. 8, 2013.

Dundas, J. et al., "Improving Data Cache Performance by Pre-Executing Instructions Under a Cache Miss." Proceedings of the 11th International Conference on Supercomputing, ACM, Jul. 1997, 8 pages.

Holmer, B. et al., "Managing Potentially Invalid Results During Runahead", U.S. Appl. No. 13/677,085, filed Nov. 14, 2012.

Ekman, M. et al., "Instruction Categorization for Runahead Operation", U.S. Appl. No. 13/708,544, filed Dec. 7, 2012.

* cited by examiner

FIG. 3
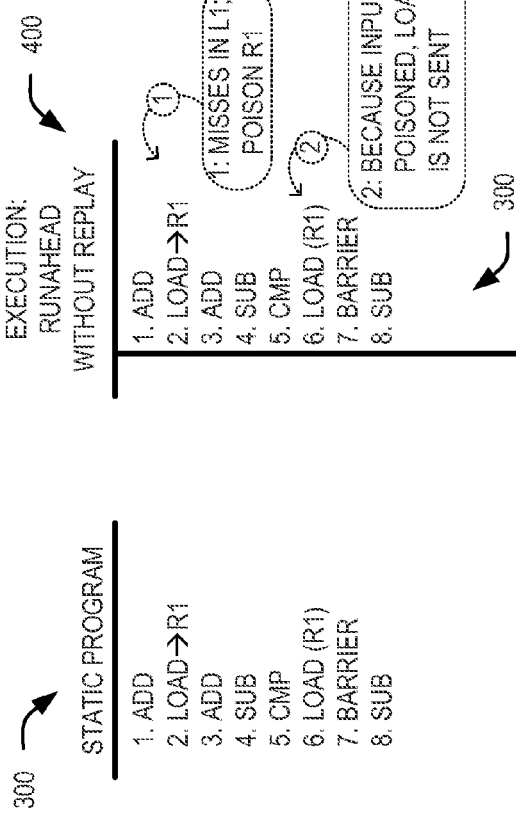
FIG. 4
FIG. 5
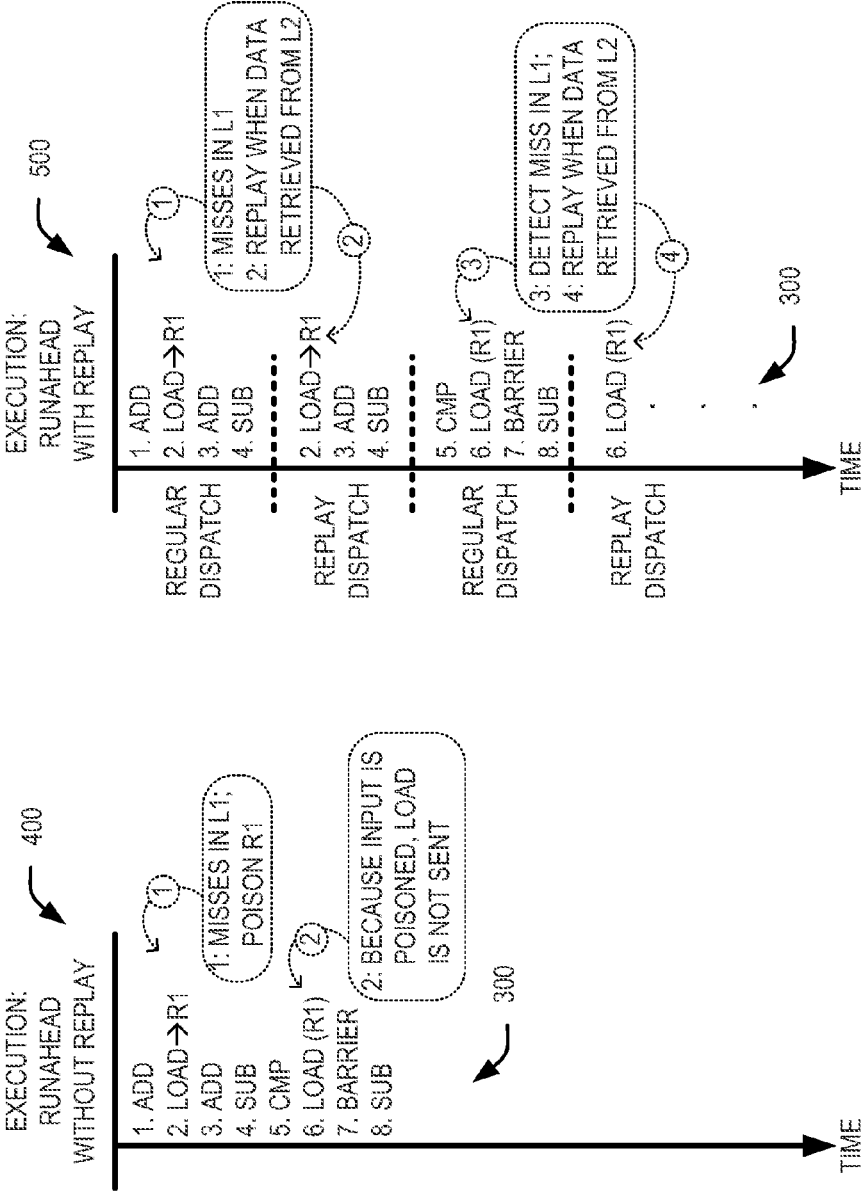

QUEUED INSTRUCTION RE-DISPATCH AFTER RUNAHEAD

BACKGROUND

Instructions in microprocessors may lead to stalls, potentially delaying instruction processing and tying up microprocessor resources. Because stalls are often unpredictable, some microprocessors resolving a first stall may speculatively execute instructions to uncover other potential stalls. While speculative execution may speed execution if a potential stall is uncovered, restarting the microprocessor after speculative execution ends and resetting the microprocessor to a pre-speculative execution state may slow execution each time speculative execution is performed.

BRIEF DESCRIPTION OF THE DRAWINGS

FIG. 3 shows an example program used to illustrate the methods depicted in FIGS. 4 and 5.

FIG. 4 schematically shows a method of operating a microprocessor in runahead according to an embodiment of the present disclosure.

FIG. 5 schematically shows another method of operating a microprocessor in runahead according to an embodiment of the present disclosure.

DETAILED DESCRIPTION

Figure 1:
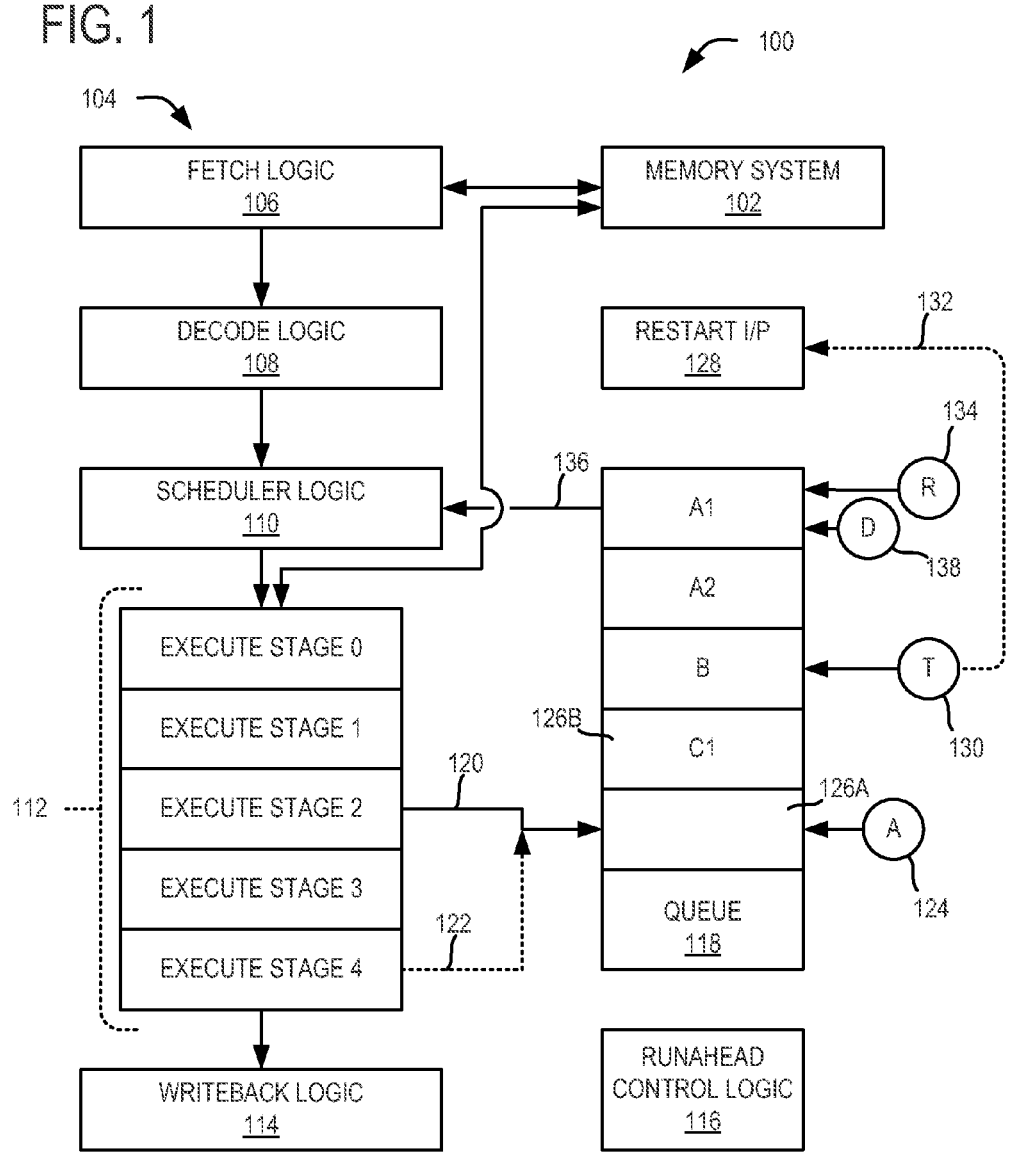
FIG. 1 schematically shows an example microprocessor according to an embodiment of the present disclosure.

In modern microprocessors, instructions are often executed in a pipeline. Such instructions may be dispatched individually or as bundles of micro-operations to various execution stages within the pipeline. Regardless of the form of the instruction when issued for execution, when the instruction is issued, it may not be known at dispatch whether a miss or an exception will arise during execution of the instruction. It may take some time to resolve some misses/exceptions before the microprocessor is able to make progress on subsequent instructions. Thus, the microprocessor may stall while attempting to resolve the underlying cause of the long-latency event. One non-limiting example of a common pipeline stall is a load operation that results in a cache miss.

In some microprocessors, a stall may trigger entrance into a runahead mode of operation configured to detect other potential stalls. In other words, a microprocessor may detect a long-latency event that could cause the microprocessor to stall. While attempting to resolve that long-latency event (e.g., the runahead-triggering event), the microprocessor may speculatively execute additional instructions to attempt to uncover other possible stalls. By uncovering other possible stalls, the microprocessor may begin resolving the long-latency events underlying those possible stalls while resolving the runahead-triggering event, potentially saving time.

As used herein, runahead operation describes any suitable speculative execution scheme resulting from a long-latency event and configured to uncover one or more other potential long-latency events that may result in stalls. Non-limiting examples of such long-latency events include cache misses (e.g., store misses and/or load misses), misses in translation lookaside buffers (e.g., instruction and/or data translation lookaside buffers), and some long-latency floating point operations (e.g., denormal square root operations).

Once a runahead-triggering event is detected, the state of the microprocessor (e.g., the register values and other suitable states) may be checkpointed so that the microprocessor may return to a pre-runahead state once the runahead-triggering event has been resolved and runahead operation ends. Checkpointing saves the current state of the microprocesor, allowing such state to be later resumed. Checkpointing may include, for example, copying the contents of registers to duplicate registers. During runahead operation, the microprocessor executes in a working state, but does not commit the results of instructions to avoid altering the microprocessor's state. Commitment updates the state of the microprocessor and may include, for example, overwriting checkpointed registers. After the runahead-triggering event is resolved, the microprocessor exits runahead and restarts. As used herein, restarting a microprocessor refers to returning to the checkpointed, pre-runahead state so that normal, non-runahead operation resumes. Restarting a microprocessor after runahead refers to restarting execution of the instructions at a pre-runahead position in the instruction flow so that instruction execution after restart continues as if runahead had never occurred, notwithstanding various actions taken to address potential long-latency events uncovered during runahead (e.g., prefetching a miss, etc.).

Typically, re-entering non-runahead operation involves re-dispatching the runahead-triggering instruction for execution, as the earlier attempt to execute the instruction that triggered runahead did not succeed. However, re-fetching an instruction from an instruction cache or a unified cache may increase the latency of re-entering non-runahead execution. Accordingly, various embodiments are disclosed herein that are related to microprocessors and methods of operating microprocessors. In one example, a runahead-triggering instruction is re-dispatched from a queue after runahead operation ends. Re-dispatching a runahead-triggering instruction from a queue instead of re-fetching it may save time that may otherwise be spent fetching and, in some settings, decoding, the instruction.

For example, in some embodiments, a queue (e.g., a replay queue) having a first purpose during ordinary operation outside of runahead may be used for another purpose during runahead. Specifically, the queue may be re-used to hold a runahead-triggering instruction and one or more additional instructions during runahead. In some embodiments, a replay queue may be used for this purpose during runahead. In one scenario according to such an embodiment, a replay queue may be used to replay instructions outside of runahead during normal operation. When a runahead-triggering instruction is encountered, that instruction, along with one or more additional instructions, is added to the repurposed replay queue. Continuing with this scenario, the repurposed replay queue is frozen once those instructions are added and runahead proceeds. Upon exit from runahead, the runahead-triggering instruction and the additional instructions are dispatched from the repurposed replay queue, potentially speeding processing after runahead as described above.

Figure 7:
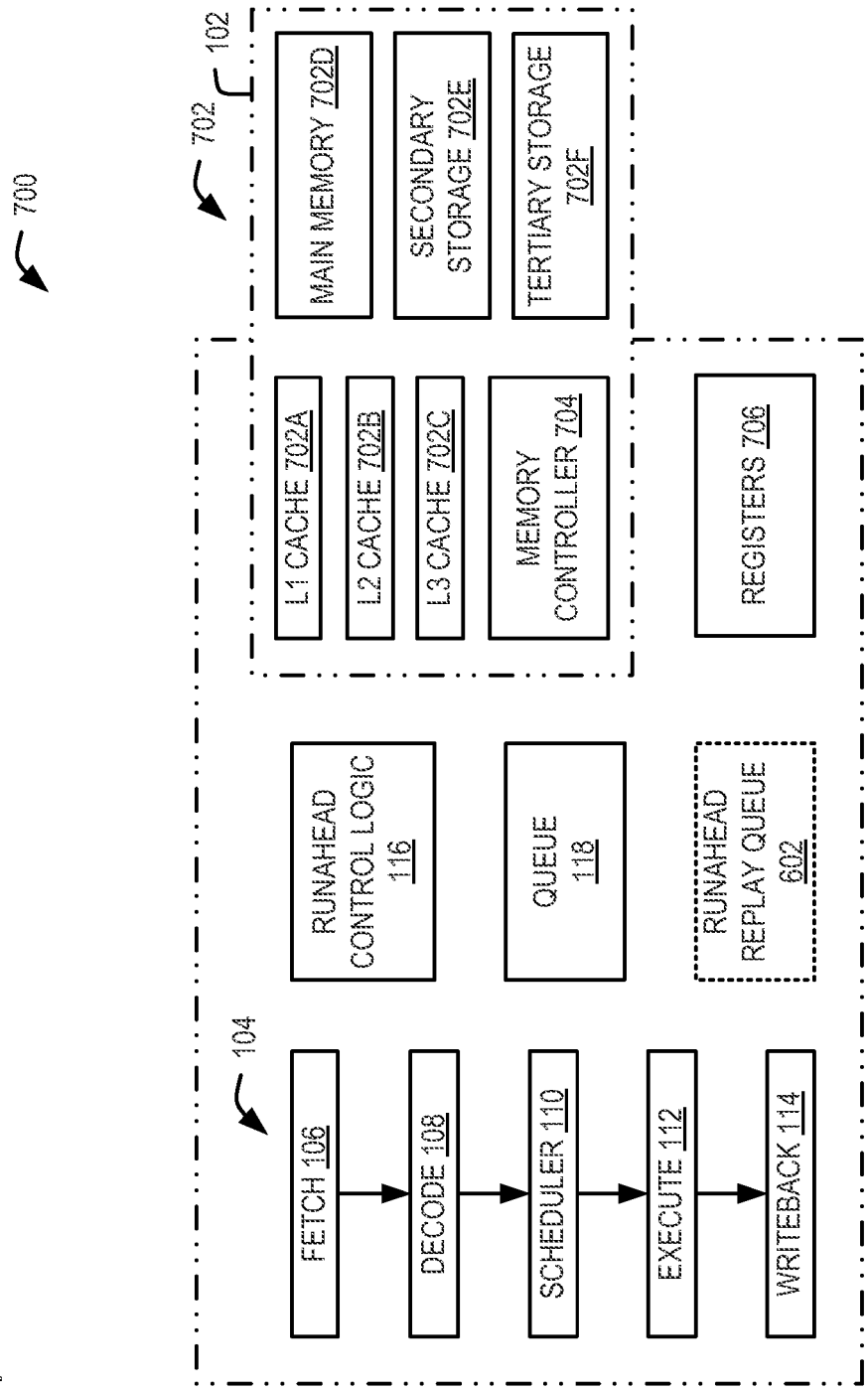
FIG. 7 schematically shows another example microprocessor according to an embodiment of the present disclosure.

FIG. 1 schematically shows an embodiment of a microprocessor 100 that may be employed in connection with the systems and methods described herein. Microprocessor 100 includes a memory system 102 configured to store instructions and a pipeline 104 configured to process instructions. Additional details about memory system 102 are illustrated in FIG. 7 and described in the accompanying text.

Memory system 102 may be configured to store any suitable type of instruction. For example, instructions may be stored in the form of instruction set architecture (ISA) instructions, micro-operations (in a suitable bundled form or not bundled), as translations of related ISA instructions, and so on. In some examples, an individual micro-operation may correspond to one or more instructions or to a portion of an instruction. In other words, a single instruction may be stored as a bundle of micro-operations in one scenario, while in another scenario a plurality of instructions may be stored as a bundle of micro-operations. Bundles, as used herein, refer to one or more micro-operations grouped together.

Pipeline 104, shown in simplified form in FIG. 1, processes one or more instructions stored in memory system 102 during program execution. Pipelining instruction processing may allow more than one instruction to be in different stages of retrieval and execution concurrently. Put differently, the various stages included in pipeline 104 may permit some instructions to be readied for execution by upstream stages while downstream stages execute other instructions and retire still other instructions.

The example pipeline 104 shown in FIG. 1 includes fetch logic 106, decode logic 108, scheduler logic 110, execution logic 112, and writeback logic 114. It will be appreciated that the logic portions displayed in the embodiment of pipeline 104 shown in FIG. 1 are provided for illustrative purposes only and that the functionality described in more detail below may be arranged in any suitable manner. For example, some embodiments of pipeline 104 may include individually pipelined portions within one or more of the execution units (e.g., one or more of fetch logic 106, decode logic 108, and so on, may include individually pipelined portions) while some embodiments may combine portions of two or more logic portions within a single pipeline execution unit.

In the embodiment shown in FIG. 1, fetch logic 106 retrieves instructions from memory system 102, typically from either unified or dedicated L1 caches backed by L2-L3 caches and main memory. Decode logic 108 decodes the instructions, for example by parsing operators/opcodes, operands, and addressing modes. Upon being parsed, the instructions are then scheduled by scheduler logic 110 for execution by execution logic 112. Execution logic 112 may include one or more execution stages (for example, execution stages 0 through 4 are shown in FIG. 1) that are configured to execute instructions issued by scheduler logic 110. Any suitable number and type of execution stages may be included within execution logic 112. Execution logic 112 may also communicate with memory system 102 (e.g., via one or more load/store units included in execution logic 112) to handle load and/or store operations encountered during operation. Once processed by execution logic 112, completed instructions may be stored in preparation for commitment by writeback logic 114. Writeback logic 114 alters the architectural state of microprocessor 100 by committing the results of completed instructions to microprocessor registers, caches, and/or memory. Put another way, writeback logic 114 performs commit functionality for microprocessor 100.

In the embodiment shown in FIG. 1, microprocessor 100 includes runahead control logic 116. Runahead control logic 116 controls entry to and exit from runahead mode for microprocessor 100. In some embodiments, runahead control logic 116 may also control other operations related to entry and exit from runahead. For example, on entry to runahead, portions of microprocessor 100 may be checkpointed to preserve the state of microprocessor 100 while a non-checkpointed working state version of microprocessor 100 speculatively executes instructions during runahead. In some of such embodiments, runahead control logic 116 may restore microprocessor 100 to the checkpointed state upon exit from runahead.

Microprocessor 100 also includes a queue 118 configured to hold one or more instructions to be re-dispatched or "replayed" by scheduler logic 110. As used herein, instruction replay refers to an instruction that is re-dispatched/reissued for execution without being re-fetched and/or re-decoded. For example, queue 118 may be used to store an instruction selected to be replayed in response to a pipeline discontinuity that caused that instruction to fail to complete after initial dispatch. The instruction may be replayed one or more times until the instruction achieves a completed state.

During normal, non-runahead operation, instructions selected for replay may pass in and out of queue 118, so that queue 118 recycles the instruction to be replayed to execution logic 112. In some embodiments, that instruction is de-allocated from queue 118 upon dispatch. Draining queue 118 of instructions as they are dispatched may free space in queue 118 so that new instructions selected for replay may be added, and may also keep instruction flow fluid. However, an event leading to a replay may also be a runahead-triggering event; therefore draining queue 118 prior to entering runahead would cause fetch logic 106 to re-fetch that instruction upon re-entering non-runahead operation. In other embodiments, instructions may not be de-allocated from queue 118 upon dispatch. Instead, instructions may remain in queue 118 until the execution of these instructions is complete and re-dispatch cannot be performed. In this embodiment, the instructions would not need to be re-inserted into the queue for checkpointing or runahead.

Accordingly, in some embodiments, queue 118 may be populated with an instruction that triggered runahead upon detection of the runahead-triggering event. By inserting the runahead-triggering instruction into queue 118, that instruction will be available for re-dispatch after runahead ends. Queue 118 may be frozen when entering runahead so that the runahead-triggering instruction will be available for dispatch upon exit from runahead no matter what occurs during runahead. It will be appreciated that freezing queue 118 may be included in checkpointing microprocessor 100 in preparation for entry into runahead in some embodiments, while in some other embodiments it may be a separate process or not performed at all.

In addition, one or more additional instructions may be inserted into queue 118 with the runahead-triggering instruction. Inserting additional instructions into queue 118 may save time that might otherwise be spent fetching and decoding those instructions when the microprocessor resumes normal operation after runahead. Put differently, in contrast to re-fetching the runahead-triggering instruction or re-issuing it (e.g., from a checkpointed state), inserting the runahead-triggering instruction and one or more additional instructions into queue 118 may allow rapid re-dispatch of those instructions to execution logic 112 from queue 118 after runahead concludes and the microprocessor resumes non-runahead operation.

While queue 118 is illustrated in a linear fashion in FIG. 1 for clarity, it will be appreciated that queue 118 may have any suitable form. For example, queue 118 may be arranged as a circular queue. Further, instructions may be inserted and dispatched from queue 118 in any suitable fashion. For example, instructions may be inserted and dispatched from queue 118 using a "first-in, first-out" format. In another example, instructions may be dispatched according to relative age since initial dispatch, which may be different from age within the queue. Queue 118 may also have any suitable size. In one non-limiting example, queue 118 may include 16 entries.

Further, in some embodiments, fetch logic 106 concurrently may retrieve one or more subsequent instructions, and decode logic 108 may decode one or more of those subsequent instructions, while the instructions held in queue 118 are being re-dispatched. In turn, the retrieval and decode time for the newly-fetched instructions may overlap the re-dispatch process for the queued instructions. Retrieving and, if appropriate, decoding, subsequent instructions may lead to a ready availability of fetched/decoded subsequent instructions for dispatch by scheduler logic 110. In turn, a microprocessor 100 may experience a near-seamless transition from re-dispatch of instructions from queue 118 to the dispatch of newly-fetched instructions.

Figure 2:
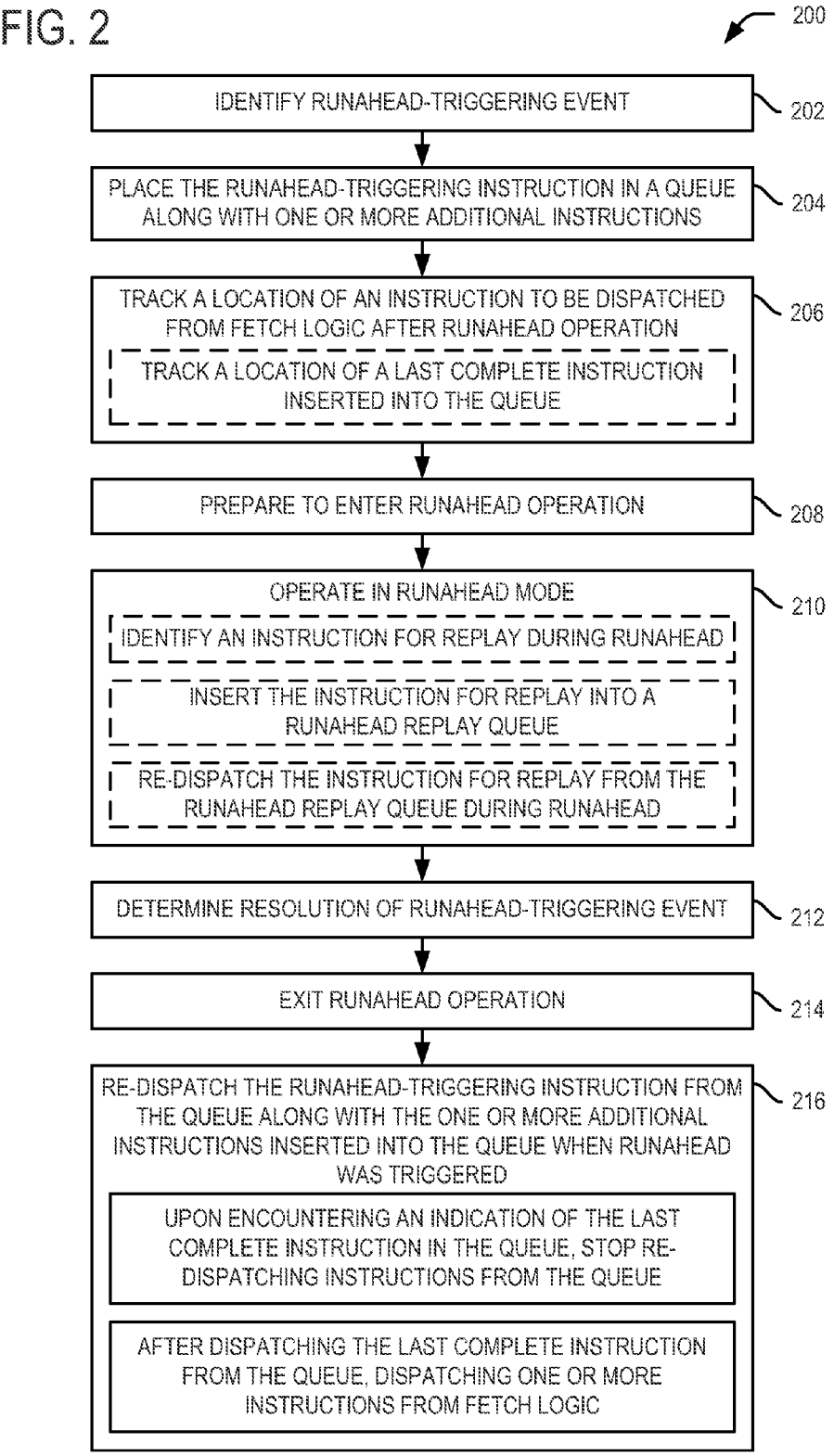
FIG. 2 shows a flowchart illustrating an example method of operating a microprocessor according to an embodiment of the present disclosure.

FIG. 2 shows a flowchart for a portion of an embodiment of a method 200 for operating a microprocessor. It will be appreciated that method 200 may be performed by any suitable hardware, including the hardware described herein. In some embodiments, one or more software modules may perform various aspects of method 200. Further, it will be appreciated that the embodiment of method 200 shown in FIG. 2 and described below is presented as an example for discussion purposes. Any of the processes described in FIG. 2 may be supplemented by other suitable processes, omitted, and/or suitably re-ordered without departing from the scope of the present disclosure.

At 202, method 200 includes identifying a runahead-triggering event. In some embodiments, a runahead-triggering event may be identified by suitable runahead control logic, though it will be appreciated that any suitable portion of a microprocessor may detect such an event. For example, a load/store execution stage included in microprocessor execution logic may detect a cache miss or a store miss; a floating point execution stage may detect a denormal square root operation, and so on. Any suitable long-latency event may be considered a runahead-triggering event. Such long-latency events may be predetermined during microprocessor design, determined dynamically during microprocessor operation, and so on.

At 204, method 200 includes inserting the runahead-triggering instruction in a queue. One or more additional instructions may be inserted into the queue with the runahead-triggering instruction. For example, FIG. 1 shows queue 118 at the beginning of runahead operation. Queue 118 includes three instructions: Instruction A, comprising two bundles (shown as Bundle A1 and Bundle A2), Instruction B, and Instruction C, comprising more than one bundle (shown as Bundle C1). In the example shown in FIG. 1, a runahead-triggering event detected at Stage 2 of execution logic 112 resulted in the associated runahead-triggering instruction (Instruction A) being inserted in queue 118 as shown via path 120. Instruction B and bundle C1 of instruction C, which followed Instruction A in execution logic 112 were also placed in queue 118. It will be appreciated that any suitable number of additional instructions may be inserted into queue 118 along with the runahead-triggering instruction. In some embodiments, the number of instructions selected for insertion into queue 118 may be selected based on the size of queue 118, the typical retrieval time and/or decode time for an instruction retrieved from a memory system, and so on. In other words, the number of instructions selected for insertion may be predetermined during a design phase and/or determined dynamically during microprocessor operation.

It will be appreciated that instructions may be inserted into queue 118 at any suitable point or position during processing. A microprocessor may have a plurality of paths configured to route instructions into the queue. For example, FIG. 1 depicts an insertion path 120 extending from Stage 2 to queue 118 and another insertion path 122 extending from Stage 4 to queue 118. While any suitable number of insertion paths may be possible without departing from the scope of the present disclosure, in some embodiments, paths may be selected that route instructions from stages where runahead-triggering events are likely to be detected to a queue. For example, an insertion path may link a load/store stage with a queue. As another example, an insertion path may link a final stage with a queue as a way of collecting instructions before they exit the pipeline. In some embodiments, runahead control logic may manage selection and/or insertion of the instructions into the queue. In some embodiments, one or more execution stages may manage selection and/or insertion of the instructions into the queue. In some other embodiments, selection and insertion of the instructions into the queue may be distributed among various portions of the microprocessor.

In some embodiments, instructions selected for insertion into the queue may be inserted at a location indicated by an allocation pointer. An allocation pointer indicates where in the queue a next instruction is to be inserted. For example, FIG. 1 shows an example allocation pointer 124 indicating a location (shown at entry 126A) for inserting another instruction into queue 118. Allocation pointer 124 is updated when an instruction is inserted into the queue. Thus, at a time immediately before the insertion of bundle C1 of Instruction C into queue 118, allocation pointer 124 was positioned at entry 126B.

When restarting/re-entering normal operation after runahead, the fetch logic is directed to the instruction pointer after the last instruction in the queue is re-dispatched so that processing continues after the last instruction inserted into the queue before runahead is re-dispatched. The instruction pointer may follow the last instruction in the queue in sequence or not, such as in the case of a taken branch. Thus, at 206, method 200 includes tracking a location of an instruction to be dispatched from fetch logic after runahead operation. Tracking the location of an instruction to be dispatched from fetch logic after runahead operation may include tracking a location for an instruction following a last instruction in the queue. In some embodiments, a restart instruction pointer may be used to track the location following the last instruction in the queue. For example, FIG. 1 depicts restart instruction pointer 128 configured to direct fetch logic 106 to the instruction pointer for the next instruction to be fetched after the last instruction in the queue is re-dispatched.

In embodiments where the queue holds ISA instructions, tracking the location of an instruction to be dispatched from fetch logic after runahead operation may be straightforward because each ISA instruction may have an instruction pointer associated with it. In some embodiments, such as embodiments where bundles of micro-operations are held in the queue, it may be that an instruction pointer associated with an instruction is included in just one of the bundles.

In such embodiments, tracking the location of the instruction to be dispatched from fetch logic after runahead operation at 206 may include tracking a location of a last complete instruction (e.g., a location/address for an instruction that follows an instruction having all of its constituent portions held in the queue) inserted into the queue. For example, the instruction pointer may be included in a last bundle in a set of instructions forming a bundle. Because it can be difficult to identify the end of an instruction from bundles of micro-operations, a tracking pointer may be used to keep track of a boundary between the last complete instruction inserted into the queue and other bundles that may be present in the queue. For example, FIG. 1 shows a tracking pointer 130 pointing to a last bundle included in Instruction B.

Tracking the location of the last complete instruction, and thus tracking the boundary between the last complete instruction and other instructions in the queue, may also include updating that location/boundary information as complete instructions are inserted into the queue. Further, updating the location/boundary information may also include updating the location information for the instruction to be fetched by the fetch logic upon exit from runahead as complete instructions are inserted into the queue. In turn, the microprocessor (for example, the scheduler logic, in some embodiments) will have access to a valid restart instruction pointer that may be sent to the fetch logic upon re-entry to normal operation after runahead, and will be able to stop re-dispatching instructions from the queue and start dispatching bundles from the fetch logic and/or the decode logic appropriately. In the example shown in FIG. 1, restart instruction pointer 128 may be updated upon an update to tracking pointer 130, the update to restart instruction pointer 128 being schematically shown at 132.

At 208, method 200 includes preparing to enter runahead operation. In some embodiments, preparations for runahead at 208 may include freezing the queue and checkpointing the state of the microprocessor, which may include checkpointing the register entry values and various states and/or bits associated with those register entries. The checkpointed values are retained in a checkpointed state for the duration of runahead. Working state versions of those values, states, and/or bits are retained, at least initially, in a working state version of the microprocessor upon entry to runahead, though one or more of those values, states, and/or bits may change during runahead operation. It will be appreciated that processes 204 and/or 206 may occur concurrently with and/or be included in preparing to enter runahead at 208 in some embodiments. In some embodiments, suitable runahead control logic may control one or more aspects of preparation for entry into runahead. For example, in the embodiment shown in FIG. 1, runahead control logic 116 may control checkpointing microprocessor 100.

At 210, method 200 includes entering and operating in runahead mode. For example, runahead control logic 116 shown in FIG. 1 may control entry into and operation during runahead. During runahead, the microprocessor speculatively executes instructions while attempting to uncover other potential long-latency events, stalls, branch mispredicts, and so on. The checkpointed microprocessor state is not altered during runahead, as a state alteration (e.g., a writeback event or an instruction commit) might impair the microprocessor's ability to return to a pre-runahead condition once the runahead-triggering event is resolved. Further, because the results generated during runahead execution may be invalid, for example, because they may rely on missing data, storing the result of runahead execution to a cache location may corrupt data held in the memory system.

Accordingly, during runahead mode, various register locations may be poisoned or otherwise marked as holding invalid data so that instruction throughput and potential discovery of other long-latency events may be advanced. After runahead ends, those register locations are restored to their pre-runahead states so that normal processing may continue.

It will be appreciated that microprocessor operation may constantly be in flux, even during runahead operation. Therefore, a microprocessor's ability to detect other long-latency events during runahead may be realized with varying success depending on how the microprocessor is being operated during runahead.

For example, FIG. 3 schematically shows an embodiment of a program 300, depicted in a static state. As shown in FIG. 3, program 300 includes eight instructions. The second instruction loads a value from memory into register R1. The sixth instruction uses the value stored in R1 to compute an address from which to load data.

FIG. 4 schematically shows an embodiment of a method 400 for executing program 300 during runahead operation (e.g., during an in-progress runahead episode). In the example shown in FIG. 4, Instruction 2 misses in the L1 cache during runahead. Having identified the L1 cache miss, the microprocessor may begin retrieving the data from a higher cache level (e.g., an L2 cache). Meanwhile, the microprocessor poisons R1 and continues to execute program 300 in runahead. Because Instruction 6 references R1, the address is not computed using the value stored in R1 and load instruction is not performed. Instead, the destination register location for Instruction 6 is poisoned and the microprocessor moves on, continuing to execute program 300. However, because Instruction 6 did not attempt to load, it is not known whether the input register location for Instruction 6 would lead to a cache hit or miss. In other words, by poisoning the destination register at Instruction 6 and moving on, the microprocessor may have sacrificed an opportunity to identify another runahead-triggering event. While the example illustrated in FIG. 4 is provided for discussion purposes, it will be appreciated that poisoning the destination register on an L1 miss without determining if it is accompanied by an L2 miss may result in settings where, for example, instructions may frequently refer to one or more poisoned locations.

Accordingly, in some embodiments, one or more instructions may be selected for re-dispatch/replay during runahead. For example, an instruction related to a short-duration event may be selected for replay. In a short-duration event, the original dispatch may not complete, but a replay after a short latency may complete. Replaying instructions during runahead may reduce the amount of poison that accumulates in the system during runahead, potentially exposing other events that might otherwise be missed. It will be understood that instructions which complete during runahead may update the current microprocessor state but not the checkpointed state, allowing the microprocessor to return to the checkpointed state upon exiting runahead.

For example, FIG. 5 schematically shows an embodiment of a method 500 for executing program 300 during runahead operation using instruction replay. In the example shown in FIG. 5, Instruction 2 misses in the L1 cache during runahead Like the example shown in FIG. 4, the microprocessor begins retrieving the data from a higher cache level (e.g., an L2 cache). Meanwhile, the microprocessor continues to execute program 300 in runahead and the instruction that triggered the miss (Instruction 2) and, in some embodiments, one or more additional instructions, is selected for replay.

When the microprocessor obtains the data from the L2 cache, it is delivered to the L1 cache and to Instruction 2, which is re-dispatched along with Instructions 3 and 4. In some embodiments, re-dispatch of the instructions may be timed so that the instruction triggering the miss is issued concurrently with the arrival of the data from the cache (e.g., the L2 cache in the example shown in FIG. 5), though it will be appreciated that any suitable manner of re-dispatching the instructions may be employed without departing from the scope of the present disclosure.

After Instruction 4 is re-dispatched, regular dispatch of Instructions 5-8 continues. Execution of Instruction 6 references R1, so the address may be computed; once computed, the load instruction for that address is sent. In the example shown in FIG. 5, Instruction 6 triggers a cache miss. In turn, the instruction that triggered the miss (Instruction 6) and, in some embodiments, one or more additional instructions, is selected for replay. When the microprocessor obtains the data from the L2 cache, it will be delivered to the L1 cache and to Instruction 6, which is re-dispatched. Thus, Instruction 6 generated an address and triggered a cache miss, which was not realized in the example shown in FIG. 4. Unlike the runahead-without-replay example shown in FIG. 4, the example shown in FIG. 5 illustrates that, in some settings, the ability to replay instructions during runahead may provide opportunities to identify long-latency events that might otherwise be missed, though there may be a decrease in instruction throughput associated with replay in runahead in some embodiments.

It will be appreciated that, in some embodiments, the queue used to hold the runahead-triggering instruction and one or more additional instructions may not be used to hold instructions selected for replay during runahead. Re-use of the queue for replay during runahead may lead to loss of an instruction during runahead, potentially impairing the ability of the microprocessor to restart/re-enter non-runahead operation once the runahead-triggering event is resolved. Thus, in some embodiments, selection of an instruction for replay during runahead may cause the microprocessor to poison the destination register of the instruction and continue runahead. In some other embodiments, encountering a replay condition during runahead may cause the microprocessor to exit runahead. It will be appreciated that these examples are non-limiting. In some embodiments, criteria used to determine whether to end runahead or to poison a destination register may be predetermined during microprocessor design.

Figure 6:
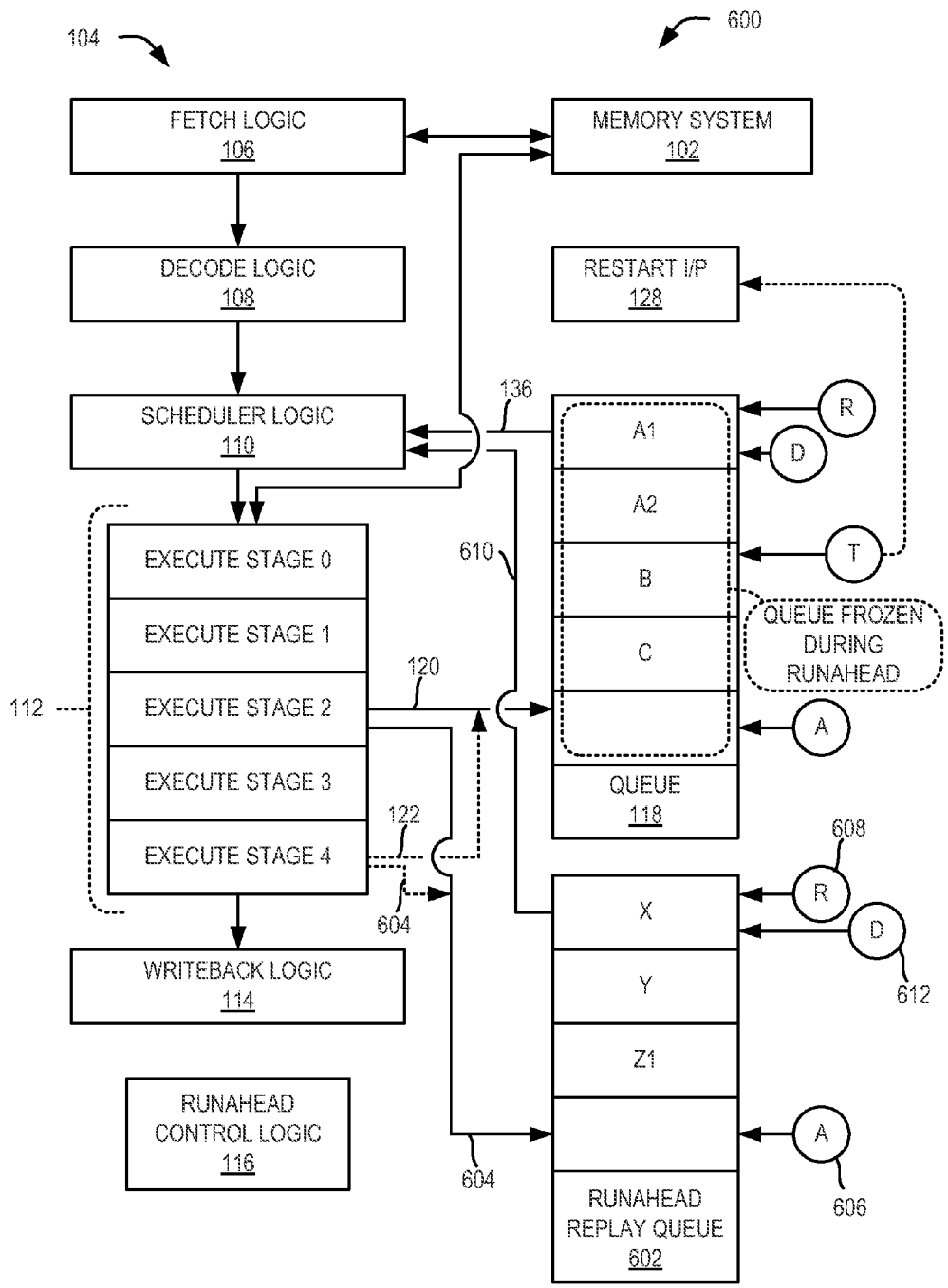
FIG. 6 schematically shows another example microprocessor according to an embodiment of the present disclosure.

In some other embodiments, an instruction may be replayed during runahead using a dedicated runahead replay queue distinct from the queue used to hold the runahead-triggering instruction. As an example, FIG. 6 schematically shows an embodiment of microprocessor 600 including a runahead replay queue 602 that is configured to hold one or more instructions selected for replay during runahead while queue 118, holding the runahead-triggering instruction, remains frozen during runahead. While runahead replay queue 602 is illustrated in a linear fashion in FIG. 6 for clarity, it will be appreciated that runahead replay queue 602 may have any suitable form. For example, runahead replay queue 602 may be arranged as a circular queue. Further, instructions may be inserted and dispatched from runahead replay queue 602 in any suitable fashion. For example, instructions may be inserted and dispatched from runahead replay queue 602 using a "first-in, first-out" format. In another example, instructions may be dispatched according to relative age since initial dispatch, which may be different from age within runahead replay queue 602. Runahead replay queue 602 may also have any suitable size. In one non-limiting example, runahead replay queue 602 may include 16 entries.

In the example shown in FIG. 6, instructions selected for replay may be inserted into runahead replay queue 602 via one or more insertion paths 604 linking portions of pipeline 104 with runahead replay queue 602. An allocation pointer 606 may be used to indicate an insertion position within runahead replay queue 602. Allocation pointer 606 may be updated when an instruction (or a portion thereof) is inserted into runahead replay queue 602.

As introduced above, in some embodiments, re-dispatch of instructions from runahead replay queue 602 may be managed so that the instruction selected for replay is issued concurrently with the occurrence of another event. For example, an instruction triggering a cache miss may be re-dispatched concurrently with the arrival of data related to that instruction from the cache. A read pointer may be used to indicate a position in runahead replay queue 602 selected to be read in preparation for dispatch to scheduler logic 110. In other words, a read pointer may indicate a read-for-re-dispatch location in runahead replay queue 602. Indicating a read-for-re-dispatch position in runahead replay queue 602 may permit various dependencies of the instruction associated with that location to be read prior to re-dispatching that instruction. For example, in the embodiment shown in FIG. 6, read pointer 608 indicates a location in runahead replay queue 602 holding Instruction X. Thus, Instruction X will be the next instruction to be routed via dispatch path 610 to scheduler logic 110 for re-dispatch to execution logic 112. Read pointer 608 may be updated when the selected instruction (or portion thereof) is dispatched to scheduler logic 110.

In some embodiments, runahead replay queue 602 may include a de-allocation pointer 612 that indicates a location in runahead replay queue 602 that is ready to be logically, and in some cases physically, removed from the queue. In other words, de-allocation pointer 612 points to an instruction that is the next instruction to be removed from runahead replay queue 602 by being overwritten, deleted, or similarly eliminated. In the example shown in FIG. 6, de-allocation pointer 612 indicates a location occupied by Instruction X. That location will be the next location to be de-allocated, leading to the elimination of Instruction X from runahead replay queue 602. De-allocation pointer 612 may be updated when the selected instruction (or portion thereof) has been dispatched to scheduler logic 110. In some embodiments, read pointer 608 may perform the function of de-allocation pointer 612, so that the location is de-allocated upon reading/dispatch as indicated by read pointer 608.

While the example shown in FIG. 6 depicts runahead replay queue 602 as separate from queue 118, it will be appreciated that, in some embodiments, a suitably-sized queue may be used to hold the runahead-triggering instruction and instructions selected for replay during runahead. For example, one portion of the queue may be frozen during runahead while another portion is active for replay. In some other embodiments, a checkpointed version of queue 118 may be used to hold the runahead-triggering instruction while a working-state version of queue 118 is used to hold instructions selected for replay during runahead, thus performing the function of runahead replay queue 602.

Regardless of whether or not replay is performed during runahead, once the initial runahead-triggering event is resolved, the microprocessor exits runahead and returns to normal, non-runahead operation. Thus, continuing with FIG. 2, at 212, method 200 includes determining resolution of the runahead-triggering event, and, at 214, exiting runahead operation. Determination that the runahead-triggering event has been resolved may be performed in any suitable way by any suitable portion of the microprocessor. For example, in the embodiment shown in FIG. 1, runahead control logic 116 is configured to determine the resolution of the runahead-triggering event and to cause the microprocessor to exit runahead. Exiting runahead may include restoring the checkpointed version of microprocessor 100, flushing pipeline 104, unfreezing queue 118, and redirecting fetch logic 106 to begin fetching instructions from restart instruction pointer 128. In embodiments where a runahead replay queue 602 is included, exiting runahead may also include flushing runahead replay queue 602.

At 216, method 200 includes re-dispatching the runahead-triggering instruction along with the one or more additional instructions inserted into the queue when runahead was triggered. The runahead-triggering instruction is re-dispatched along with the additional instructions. After dispatching the last of the additional instructions, the microprocessor begins dispatching newly-fetched instructions.

Re-dispatching the runahead-triggering instruction from the queue after runahead may include dispatching the runahead-triggering instruction from a location indicated by a read pointer. In other words, a read pointer may indicate a read-for-re-dispatch location in queue 118. Indicating a read-for-re-dispatch position in queue 118 may permit various dependencies of the instruction associated with that location to be read prior to re-dispatching that instruction. For example, in the embodiment shown in FIG. 1, read pointer 134 indicates a location in queue 118 holding Bundle A1 of Instruction A. Thus, Bundle A1 will be the next instruction dispatched to scheduler logic 110, routed via dispatch path 136 for re-dispatch to execution logic 112. Read pointer 134 may be updated when the selected instruction (or portion thereof) is dispatched to scheduler logic 110. It will be appreciated, however, that in other embodiments dispatch path 136 may dispatch instructions directly to execution logic 112 and any stage therein.

In some embodiments, queue 118 may include a de-allocation pointer 138 that indicates a location in queue 118 that is ready to be logically, and in some cases physically, removed from the queue. In other words, de-allocation pointer 138 points to an instruction that is the next instruction to be removed from queue 118 by being overwritten, deleted, or similarly eliminated. In the example shown in FIG. 1, de-allocation pointer 138 indicates a location occupied by Bundle A1 of Instruction A. That location will be the next location to be de-allocated, leading to the elimination of Bundle A1 from queue 118. De-allocation pointer 138 may be updated when the selected instruction (or portion thereof) has been dispatched to scheduler logic 110. In some embodiments, read pointer 134 may perform the function of de-allocation pointer 138, so that the location is de-allocated upon reading/dispatch as indicated by read pointer 134.

Once the last instruction inserted into the queue with the runahead-triggering instruction is re-dispatched from the queue, the microprocessor stops re-dispatching instructions from the queue and starts dispatching instructions retrieved by the fetch logic. Thus, re-dispatching at 216 includes stopping the re-dispatch of instructions from the queue upon encountering an indication of the last complete instruction inserted into the queue. For example, in the embodiment shown in FIG. 1, microprocessor may stop re-dispatching instructions from queue 118 upon encountering tracking pointer 130. Further, re-dispatching at 216 includes dispatching instructions retrieved by the fetch logic after re-dispatching the last complete instruction from the queue.

In some embodiments, re-dispatching at 216 may include sending the location associated with a restart instruction pointer used to track a location following a last instruction in the queue to a front-end of pipeline (e.g., fetch logic in some embodiments), although this location may be sent at 214 or at another suitable point upon exiting runahead without departing from the scope of this disclosure. For example, in the embodiment shown in FIG. 1, an instruction retrieved by fetch logic 106 from a location indicated by restart instruction pointer 128 is dispatched to execution logic 112. In some embodiments, the newly-fetched instruction may be dispatched from scheduler logic 110 and/or from fetch logic 106. For example, a newly-fetched instruction retrieved from the location indicated by restart instruction pointer 128 may be dispatched from fetch logic 106 to decode logic 108 for decoding in a case of an architectural instruction. In some embodiments, the newly-fetched instruction retrieved from the location indicated by restart instruction pointer 128 may bypass decode logic 108 in a setting where the newly-fetched instruction includes a native translation of an architectural instruction. Regardless of whether the instruction is decoded or not, upon arrival at scheduler logic 110 the newly-fetched instruction is dispatched to execution logic 112 after the last complete instruction inserted into queue 118 is re-dispatched.

FIG. 7 schematically depicts an embodiment of a microprocessor 700 that illustrates additional details included in some examples of memory system 102. The embodiment of microprocessor 700 shown in FIG. 7 depicts memory system 102. Memory system 102 includes a memory hierarchy 702, which may include an L1 processor cache 702A, an L2 processor cache 702B, an L3 processor cache 702C, main memory 702D (e.g., one or more DRAM chips), secondary storage 702E (e.g., magnetic, solid state, and/or optical storage units) and/or tertiary storage 702F (e.g., a tape farm). It will be understood that the example memory/storage components are listed in increasing order of access time and capacity, though there are possible exceptions.

A memory controller 704 may be used to handle the protocol and provide the signal interface required of main memory 702D and to schedule memory accesses. The memory controller can be implemented on the processor die or on a separate die. It is to be understood that the memory hierarchy provided above is non-limiting and other memory hierarchies may be used without departing from the scope of this disclosure.

The embodiment of microprocessor 700 shown in FIG. 7 also includes one or more processor registers 706. In some embodiments, registers 706 may be included in a general purpose register file or otherwise suitably distributed within microprocessor 700. Registers 706 store data and/or instructions used during operation. For example, a pipeline stage may obtain data from an input register, perform a specified operation using the obtained data, and then store the result at a destination register. It will be appreciated that the labels "destination register" and "input register" are relative terms. For example, a destination register for a first operation may act as an input register for another operation; likewise, an input register for one operation may have served as a destination register for a prior operation, and so on.

In some embodiments, one or more registers 706 may be augmented with a poison bit configured to indicate the trustworthiness of an associated location in register 706. Stated differently, each poison bit indicates the validity/invalidity of the data included in the associated register 706.

For example, a poison bit may be used to indicate whether a particular register entry becomes invalid during runahead operation.

The embodiment of microprocessor 700 shown in FIG. 7 includes pipeline 104. Pipeline 104 includes fetch logic 106, decode logic 108, scheduler logic 110, execution logic 112, and writeback logic 114. It will be understood that the stages included in pipeline 104 in the embodiments shown in FIG. 7, as well as those shown in FIGS. 1 and 6, are illustrative of a typical RISC implementation, thought they are not meant to be limiting. For example, in some embodiments, the fetch logic and the scheduler logic functionality may be provided upstream of a pipeline, such as compiling VLIW instructions or instruction-set translation. In some other embodiments, the scheduler logic may be included in the fetch logic and/or the decode logic of the microprocessor. More generally, a microprocessor may include fetch, decode, and execution logic, each of which may comprise one or more stages, with mem (e.g., load/store) and writeback functionality being carried out by the execution logic. The present disclosure is equally applicable to these and other microprocessor implementations, including hybrid implementations that may use VLIW instructions and/or other logic instructions.

In the described examples, instructions may be fetched and executed one at a time, possibly requiring multiple clock cycles. During this time, significant parts of the data path may be unused. In addition to or instead of single instruction fetching, pre-fetch methods may be used to enhance performance and avoid latency bottlenecks associated with read and store operations (e.g., the reading of instructions and loading such instructions into processor registers and/or execution queues). Accordingly, it will be appreciated that any suitable manner of fetching, scheduling, and dispatching instructions may be used without departing from the scope of the present disclosure.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A method comprising:
exiting runahead operation of a processor;
subsequent to said exiting, entering normal operation of said processor;
subsequent to said entering, dispatching a plurality of instructions from a replay queue,
wherein said replay queue is configured to hold said plurality of instructions during said runahead operation,
wherein instructions are not executed from said replay queue during said runahead operation; and
executing said plurality of instructions in said normal operation of said processor.

2. The method of claim 1 wherein said plurality of instructions comprises a runahead-triggering instruction and one or more additional instructions.

3. The method of claim 2 further comprising:
responsive to a runahead-triggering event, storing said runahead-triggering instruction and one or more additional instructions in said replay queue.

4. The method of claim 3 further comprising:
subsequent to said storing, freezing said replay queue during said runahead operation.

5. The method of claim 1 wherein said replay queue is further configured to replay instructions during said normal operation.

6. The method of claim 1 further comprising:
responsive to an indication of a last complete instruction in the replay queue, stopping executing instructions from said replay queue.

7. The method of claim 6 further comprising:
subsequent to dispatching the last complete instruction in the replay queue, dispatching one or more instructions from another memory, different from said replay queue.

8. A computer system comprising:
a replay queue configured to hold a plurality of instructions during runahead operation of a processor,
wherein said instructions are operable to be dispatched from said replay queue for execution without being fetched or decoded;
mode change logic configured to enter said processor into normal operation subsequent to exiting runahead operation of said processor;
dispatch logic configured to dispatch a plurality of instructions from said replay queue upon said processor entering said normal operation; and
execution logic configured to execute said plurality of instructions in said normal operation of said processor.

9. The system of claim 8 further comprising:
runahead-triggering logic configured to trigger said runahead operation of said processor responsive to a runahead-triggering instruction.

10. The system of claim 9 wherein said runahead-triggering logic is further configured to store said runahead-triggering instruction and one or more additional instructions in said replay queue.

11. The system of claim 8 further comprising:
freeze logic configured to freeze said replay queue during said runahead operation.

12. The system of claim 8 wherein said replay queue is further configured to replay instructions during said normal operation.

13. The system of claim 8 further comprising:
stop logic configured to stop executing instructions from said replay queue, responsive to an indication of the last complete instruction in the replay queue.

14. The system of claim 8 wherein said dispatch logic is further configured to dispatch one or more instructions from a store other than said replay queue, subsequent to dispatching a last complete instruction in the replay queue.

15. A method of executing instructions, the method comprising:
in a normal operation of a processor, retrieving instructions from a memory system;
placing a runahead-triggering instruction and one or more instructions in a replay queue;
subsequent to said placing, entering a runahead operation of said processor responsive to said runahead-triggering instruction;
freezing said replay queue during said runahead operation of said processor;
dispatching instructions from said memory system during said runahead operation of said processor;
resolving a runahead-triggering condition;
exiting said runahead operation of said processor;
re-entering said normal operation; and
subsequent to said re-entering, dispatching said runahead-triggering instruction from said replay queue.

16. The method of claim 15 further comprising:
subsequent to said exiting, dispatching, from said replay queue, said one or more instructions subsequent to said dispatching said runahead-triggering instruction.

17. The method of claim 15 wherein said replay queue is further configured to replay instructions during said normal operation.

18. The method of claim 15 wherein said placing said runahead-triggering instruction in said replay queue occurs prior to executing said runahead-triggering instruction.

19. The method of claim 15 further comprising:
responsive to an indication of a last complete instruction in the replay queue, stopping dispatching instructions from said replay queue.

20. The method of claim 19 further comprising:
subsequent to dispatching the last complete instruction in the replay queue, dispatching one or more instructions from said memory system.

* * * * *